United States Patent
Gumpoltsberger et al.

(10) Patent No.: US 8,210,982 B2
(45) Date of Patent: *Jul. 3, 2012

(54) MULTI-STEP-TRANSMISSION

(75) Inventors: Gerhard Gumpoltsberger, Friedrichshafen (DE); Martin Brehmer, Tettnang (DE); Peter Ziemer, Tettnang (DE); Peter Tiesler, Meckensbeuren (DE); Gabor Diosi, Friedrichshafen (DE); Josef Haupt, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 452 days.

This patent is subject to a terminal disclaimer.

(21) Appl. No.: 12/538,945

(22) Filed: Aug. 11, 2009

(65) Prior Publication Data

US 2010/0041509 A1 Feb. 18, 2010

(30) Foreign Application Priority Data

Aug. 13, 2008 (DE) .......................... 10 2008 041 195

(51) Int. Cl.
*F16H 3/44* (2006.01)
(52) U.S. Cl. ....................................... 475/284
(58) Field of Classification Search .................. 475/284, 475/276, 311, 317, 323
See application file for complete search history.

(56) References Cited

U.S. PATENT DOCUMENTS

| | | | |
|---|---|---|---|
| 4,395,925 A | 8/1983 | Gaus | |
| 5,106,352 A | 4/1992 | Lepelletier | |
| 6,558,287 B2 | 5/2003 | Hayabuchi et al. | |
| 6,572,507 B1 | 6/2003 | Korkmaz et al. | |
| 6,634,980 B1 | 10/2003 | Ziemer | |
| 6,860,831 B2 | 3/2005 | Ziemer | |
| 6,955,627 B2 | 10/2005 | Thomas et al. | |
| 6,960,149 B2 * | 11/2005 | Ziemer | 475/276 |
| 6,991,578 B2 | 1/2006 | Ziemer | |
| 7,549,942 B2 | 6/2009 | Gumpoltsberger | |
| 7,556,582 B2 | 7/2009 | Gumpoltsberger | |

(Continued)

FOREIGN PATENT DOCUMENTS

DE 29 36 969 A1 4/1981

(Continued)

OTHER PUBLICATIONS

Gumpoltsberger, Gerhard: Systematische Synthehse and Bewertung von mehrgangigen Plantengetriegen. Dissertation TU Chemnitz, 2007 das ges. Dokument insb. Kap. 1.2.

(Continued)

*Primary Examiner* — David D Le
*Assistant Examiner* — David J Hlavka
(74) *Attorney, Agent, or Firm* — Davis & Bujold, P.L.L.C.

(57) ABSTRACT

A multi-step transmission including four gear sets, shafts, and shifting elements. The sun gear of gearset (P4) couples shaft (3) which communicates, via brake (03), with the housing. The carrier of gearset (P4) couples the output shaft, which couples the ring gear of gearset (P2). The ring gear of gearset (P4) couples shaft (7), which couples the carrier of gearset (P2) and, via clutch (17), communicates with the drive shaft, which communicates, via clutch (18), with the ring gear of gearset (P1) coupled to shaft (8), and, via clutch (15), communicates with shaft (5). Shaft (5) couples the sun gear of gearset (P3), and, via brake (05), communicates with the housing. The carrier of gearset (P1) couples the shaft (6), the ring gear of gearset (P3) and the sun gear of gearset (P2). The carrier of gearset (P3) couples the shaft (4), which, via brake (4), communicates with the housing.

15 Claims, 2 Drawing Sheets

U.S. PATENT DOCUMENTS

| | | |
|---|---|---|
| 7,566,283 B2 | 7/2009 | Gumpoltsberger |
| 7,699,743 B2 | 4/2010 | Diosi et al. |
| 7,736,262 B2 * | 6/2010 | Suh .............................. 475/276 |
| 2008/0161149 A1 | 7/2008 | Diosi et al. |
| 2009/0011891 A1 | 1/2009 | Phillips et al. |
| 2010/0048344 A1 | 2/2010 | Kamm et al. |
| 2011/0009228 A1 | 1/2011 | Bauknecht et al. |
| 2011/0183807 A1 * | 7/2011 | Gumpoltsberger et al. .. 475/288 |

FOREIGN PATENT DOCUMENTS

| | | |
|---|---|---|
| DE | 199 12 480 A1 | 9/2000 |
| DE | 199 49 507 A1 | 4/2001 |
| DE | 101 15 983 A1 | 10/2002 |
| DE | 101 15 987 A1 | 10/2002 |
| DE | 101 15 995 A1 | 10/2002 |
| DE | 102 13 820 A1 | 10/2002 |
| DE | 10 2005 010 837 A1 | 9/2005 |
| DE | 10 2004 040 597 A1 | 2/2006 |
| DE | 10 2005 002 337 A1 | 8/2006 |
| DE | 10 2005 010 210 A1 | 9/2006 |
| DE | 10 2005 032 881 A1 | 1/2007 |
| DE | 10 2006 006 622 A1 | 9/2007 |
| DE | 10 2006 006 636 A1 | 9/2007 |
| DE | 10 2006 006 637 A1 | 9/2007 |
| DE | 10 2008 000 428 | 2/2008 |
| DE | 10 2008 000 428.6 | 2/2008 |
| DE | 10 2008 007 574 A1 | 8/2008 |
| DE | 10 2008 016084 A1 | 10/2008 |
| EP | 0 434 525 A1 | 6/1991 |
| JP | 2005061445 A | 3/2005 |
| JP | 2006349153 A | 12/2006 |
| JP | 10 2006 006 637 A1 | 9/2007 |

OTHER PUBLICATIONS

Gumpoltsberger, Gerhard: Systematic Synthesis and Evaluation of Multi-Stage Planetary Transmissions, Dissertation TU Chemnitz, 2007.

Gumpoltsberger, Gerhard: Synthesis of Planetary Transmissions, ZF Friedrichshafen AG, 2009, 13 pages, Germany.

* cited by examiner

| GEAR | ENGAGED SHIFTING ELEMENTS | | | | | | i | phi |
|---|---|---|---|---|---|---|---|---|
| | 03 | 04 | 05 | 15 | 17 | 18 | | |
| 1. | x | x | | | | x | 3.84 | 1.60 |
| 2. | x | | x | | | x | 2.40 | 1.40 |
| 3. | x | | | x | | x | 1.71 | 1.33 |
| 4. | x | | | | x | x | 1.29 | 1.29 |
| 5. | | | | x | x | x | 1.00 | 1.19 |
| 6. | | | x | | x | x | 0.84 | 1.15 |
| 7. | | x | | | x | x | 0.73 | 1.22 |
| 8. | | x | x | | x | | 0.60 | 1.19 |
| 9. | | x | | x | x | | 0.50 | 7.62 |
| R. | x | x | | x | | | -3.60 | -0.94 |

MULTI-STEP-TRANSMISSION

This application claims priority from German patent application serial no. 10 2008 041 195.7 filed Aug. 13, 2008.

FIELD OF THE INVENTION

This invention concerns a multi-step transmission, designed as a planetary configuration, particularly an automatic transmission for an.

BACKGROUND OF THE INVENTION

State of the art automatic transmissions, especially for automobiles, comprise planetary sets, which are shifted by means of friction elements and shift elements, like clutches and brakes, and are generally and selectively connected with a sliding start-up element having a bypass clutch, like in the case of a hydro-dynamic torque converter or a flow-based clutch.

Such automatic transmissions are known, for instance, through the filing of DE 199 49 507 A1, of a multi-step transmission, in which, at the drive shaft, two non-switchable front end gear sets are provided, which generate two rotational speed values on the output side, which, beside the drive shaft's rotational speed, can electively be shifted to a double planetary set in a manner, through selective engagement of the applied shift elements, so that in the case of shifting to the next higher gear or lower gear, only one shift element of the both just activated shift elements have to be enabled or disabled. Through the use of five shift elements, seven forward gear positions are being achieved, through the use of six shift elements, nine or ten forward gear positions.

In addition, known through DE 102 13 820 A1, is a multi gear automatic transmission with eight forward gear positions and one reverse gear position, comprising a first input path T1 of a first gear ratio, an input path T2, having a larger gear ratio as this input path T1, a planetary gear set of the Ravigneaux type with four elements, whereby the four elements comprise a first element, a second element, a third element, and a fourth element, in that order, is the content of a rotational speed diagram; a clutch C-2, which transfers rotation of the input path T2 to the first element S3; a clutch C-1, which transfers rotation from the input path T2 to the fourth element S2; a clutch C-4, which transfers rotation from the input path T1 to the first element; a clutch C-3 which transfers rotation from the input path T1 to the second element C3; a brake B-1, which establishes engagement of the fourth element; a brake B-2, which establishes engagement of the second element; and an output element, which is linked with the third element S3.

A nine-gear multi step transmission is also known in the art through DE 29 36 969 A1; it comprises eight shift elements and four gear sets, whereby one gear set serves as an intermediate gear, the main transmission features a Simpson set and an additional gear set as reverse transmission.

Additional multi step transmissions are known in the art, as an example, from the applicant DE 102005010210 A1 and DE 102006006637 A1.

Transmissions which are automatically switchable, based on planetary design, are generally and often described in the art and undergo continuous further development and improvements. These transmissions should present minimal effort in the assembly, include a small number of shift elements, and should avoid during sequential shifting the possible double shift, so that, during shifting in defined gear groups, just one shift element will be changed at a time.

Known to the applicant, from the non-published DE 102008000428.3, is a multi-step transmission of a planetary design, comprising an input drive and an output drive, which are arranged in a housing. The known transmission includes at least four planetary gear sets, named herein as first, second, third, and fourth planetary gear set, at least eight rotatable shafts—named herein as drive shaft, output shaft, third, fourth, fifth, sixth, seventh, and eighth shaft—as well as at least six shift elements, comprising brakes and clutches, whose selective engagement causes different gear ratios between the input and the output, so that preferably nine forward gear positions and one reverse gear position are feasible.

Hereby, the first and second planetary gear set, preferably designed as minus-planetary sets, exhibit a switchable intermediate wheel set, whereby the third and the fourth planetary set are a main wheel set.

In the known multi-step transmission, it is provided that the carriers of the first and second planetary gear set are coupled to each other via the fourth shaft, which is connected to an element of the main gear set; that the ring gear of the first planetary gear set is coupled to the sun gear of the second planetary gear set via the eighth shaft, which can be detachably connected via a first clutch with the driveshaft; and that the sun gear of the first planetary gear set can be coupled by means of the third shaft via a first brake to a housing and can be detachably connected via a second clutch with the driveshaft, in which case the ring gear of the planetary gear set can be coupled by means of the fifth shaft via a second brake to a housing of the transmission. In addition, the seventh shaft is permanently connected to at least one element of the main transmission and can be coupled via a third brake to a housing of the transmission, in which case the sixth shaft is permanently connected with at least one additional element of the main gear set and can be detachably connected via a third clutch with the driveshaft; the output shaft is permanently connected to at least one additional element of the third gear set.

In the known transmission, the fourth shaft is preferably permanently connected to the ring gear of the planetary gear set, in which case the sixth shaft is permanently connected to the ring gear of the fourth planetary gear set and the carrier of the third planetary gear set, and can be detachably connected via the third clutch to the driveshaft. In addition, the seventh shaft is permanently connected to the sun gears of the third and fourth planetary gear set and can be coupled via the third brake to a housing of the transmission. The output is supplied by means of the output shaft being permanently connected to the carrier of the fourth planetary gear set. In addition, the third and fourth planetary gear can be combined into, or, as the case may be, reduced to a Ravigneaux set with a common carrier and a common ring gear.

SUMMARY OF THE INVENTION

The present invention's task is to propose a multi-step transmission as was mentioned in the beginning, which has at least nine forward gears and at least one reverse gear and a sufficient transmission ratio, in which the construction costs and the size, in particular the length or weight, respectively, being optimized and the efficiency being improved in regard to drag losses and gearing losses. Furthermore, this invention's multi-step transmission shall operate needing lower resting forces on the shift elements. In particular, the invented transmission shall be applicable as front-transverse structure.

Thus, a multi-step transmission, in accordance with this invention, is proposed in a planetary configuration, having a drive and an output, arranged in a housing. In addition, at least four planetary gear sets are provided, preferably designed as minus-planetary bear sets, and identified in the following as first, second, third, and fourth planetary gear set, at least eight rotatable shafts, identified in the following as drive shaft, output shaft, third, fourth, fifth, sixth, seventh, and eighth shaft—and at least six shift elements, comprising brakes and clutches, the selective engagement of which generate different transmission ratios between the drive and the output, so that, preferably, nine forward gears and one reverse gear are feasible.

As known, a simple minus-planetary gear set comprises a sun gear, a ring gear, and a planet carrier, on which the planet gears are rotatably mounted, meshing in each case with the sun gear and the ring gear. Hereby, the ring gear demonstrates, in the case of a fixed planet carrier, an opposite direction of rotation to the sun gear. In comparison, a simple plus-planetary gear set comprises a sun gear, a ring gear, and a planet carrier, on which inner and outer planetary gears are rotatably mounted, whereby all inner planetary gears mesh with the sun gear and all outer planetary gears with the ring gear, whereby each inner planetary gear is always meshing with an outer planetary gear. Hereby, the ring gear demonstrates the same rotational direction, with a fixed planet carrier, as the sun gear.

In accordance with the invention, the sun gear of the fourth planetary gear set is linked with the third shaft, which is engagable with the transmission's housing by means of a first brake, whereby the planet carrier of the fourth planetary set is linked to the drive shaft, which is linked with the ring gear of the second planetary set. In addition, the ring gear of the fourth planetary set is linked with the seventh shaft, which is linked to the planet carrier of the second planetary set, and detachably connected through a clutch to the drive shaft. Hereby, the drive shaft is detachably connectable, via a second clutch and an eighth shaft to the ring gear of the first planetary set and via a third clutch with the fifth shaft, whereby the fifth shaft is linked with the sun gears of the first and third planetary set, and which can be coupled through a second brake to the transmission housing G.

In addition, the carrier of the first planetary set is linked with the sixth shaft, which is connected to a part combining the ring gear of the third planetary set and the sun gear of the second planetary set, whereby the planet carrier of the third planetary set, is linked to the fourth shaft, which is coupled to the transmission housing via a third brake.

Through the embodiment of the inventive multi-step transmission, usable transmission ratios result, in particular for passenger cars, as well as a significant increase the total spread of the multi-step transmission, generating an improvement of the drive comfort and a significant reduction of the consumption.

In addition, with the inventive multi-step transmission, the construction costs are reduced significantly, by using a lesser amount of shifting elements. The multi-step transmission, in accordance with the invention, allows starting by means of a hydrodynamic transducer, an external starting clutch, or other suitable, external starting elements. It is also conceivable to enable starting through an integrated starting element in the transmission. Preferably suitable is a shifting element that is activated in the first forward and the reverse gear.

Also, the multi-step transmission, in accordance with the invention, offers a proper efficiency of the main gears, in regard to drag losses and meshing losses.

Furthermore, fewer forces are present in the multi-step transmission's shift elements and in the planetary gear sets, advantageously reducing the wear and tear of the multi-step transmission. In addition, the lesser forces allow adequately smaller dimensions, whereby the needed size and costs are being reduced. Also, low rotations exist in regard to the shafts, the shift elements, and the planetary gear sets.

In addition, this invention's transmission is designed in such way that it can be adapted to different drive train embodiments, both in regard to the direction of the power flow, as well as the needed space.

BRIEF DESCRIPTION OF THE DRAWINGS

The invention will be described below with reference to the example show in the included drawings. These represent.

DETAILED DESCRIPTION OF THE PREFERRED EMBODIMENTS

Figure 1:
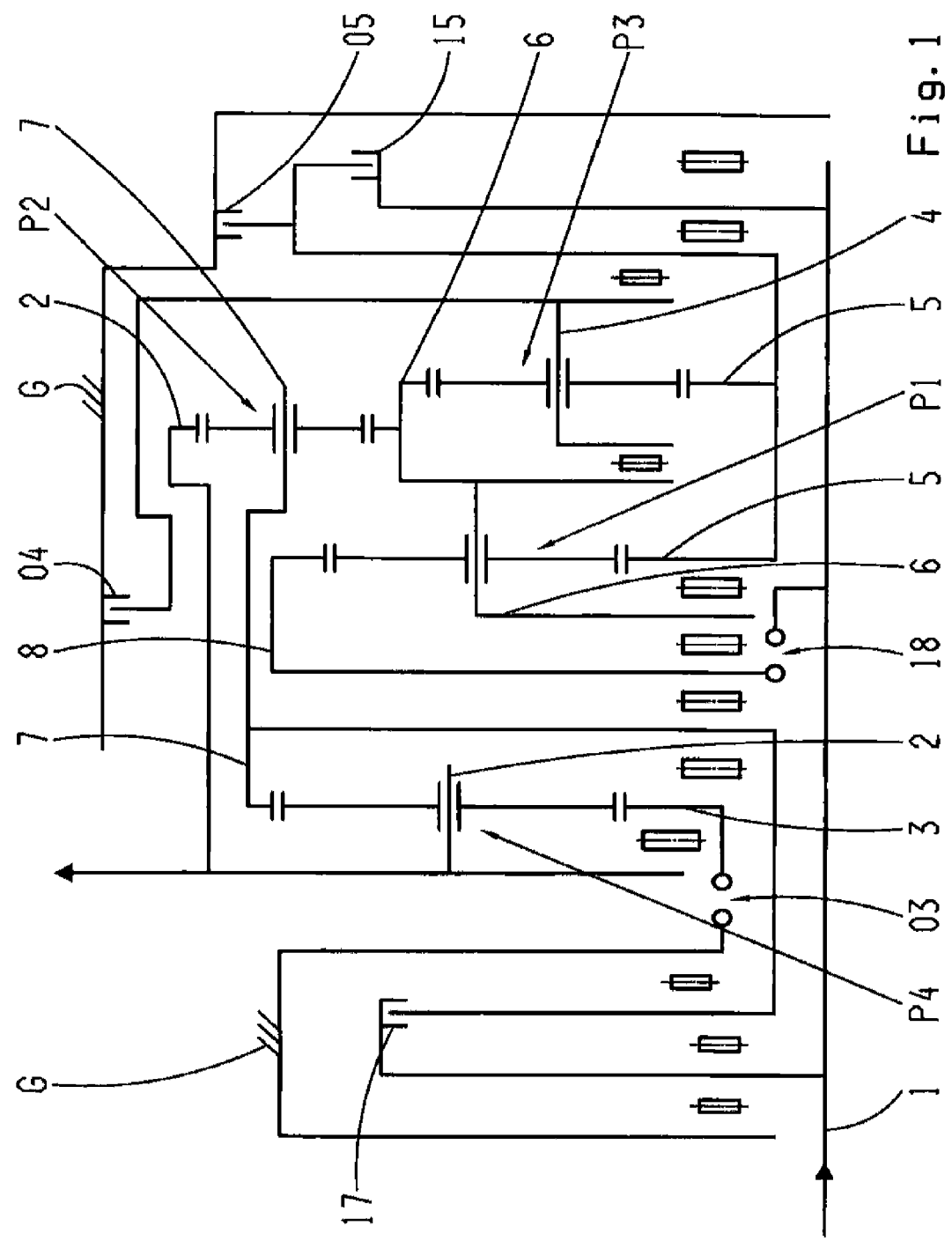
FIG. 1 A schematic view of a preferred embodiment of the multi-step transmission, in accordance with the invention.

In FIG. 1, a multi-step transmission is shown, in accordance with the invention, comprising a drive shaft 1, an output shaft 2, and four planetary sets P1, P2, P3, P4, which are being arranged in a housing G. The four planetary sets P1, P2, P3, P4, are being designed as minus-planetary sets.

In the embodiment shown, which suits itself especially in a front-transversal construction, the second and third planetary gear sets P2, P3, viewed axially, are positioned in the same gear set level, whereby the second planetary set P2, viewed radially, is positioned above the third planetary set P3, by which the total of four planetary gear sets in a beneficial way, when viewed spatially and axially, are limited to three gear set levels. Herein, the ring gear of the planetary set P3 is linked through a part with the sun gear of the second planetary set P2. Viewed axially, the planetary gear sets are arranged in the order of P3/P2, P1, P4.

As evident in FIG. 1, six shift elements, namely three brakes 03, 04, 05, and three clutches 15, 17, 18, are included. The shift elements spatial positioning is arbitrary and is limited only by the dimensions and design.

Through these shift elements, a selective shifting of nine forward gear positions and one reverse gear is feasible. The multi-step transmission, in accordance with the invention, comprises all together eight rotatable shafts, in particular shaft 1, 2, 3, 4, 5, 6, 7, and 8, whereby the drive shaft is being designated as the first shaft and the output shaft is being assigned as the second shaft of the transmission.

In accordance with the invention of the multi-step transmission and FIG. 1, the sun gear of the fourth planetary gear set is linked with the third shaft 3, which can be coupled with the transmission's housing G by means of a first brake 03, whereby the planet carrier of the fourth planetary set P4 is linked with the output shaft 2, which is linked with ring gear of the second planetary set P2. Further, the ring gear of the fourth planetary gear set P4 is linked with the shaft 7, which is linked with the planet carrier of the second planetary set P2, and detachably connected through a first clutch 17 with the drive shaft 1, which, through a second clutch 18, is detachably connected with the ring gear of the first planetary gear set P1, being linked to the eighth shaft 8, and through a third clutch 15 detachably connected with the fifth shaft 5, whereby the fifth shaft 5 is linked with the sun gear of the third planetary set P3 and the sun gear of the first planetary gear set P1, and coupled to the transmission's housing G through a second brake 05.

As seen in FIG. 1, the planet carrier of the first planetary set P 1 is linked to the shaft 6, which is connected with the part which combines the ring gear of the third planetary gear set P3 together with the sun gear of the second planetary gear set P2, whereby the planet carrier of the third planetary set P3 is linked with the fourth shaft 4, which is coupled with the transmission's housing G through a third brake 04.

Preferably, the first clutch 17, viewed in the direction of the flow of force under traction conditions, is positioned in front of the fourth planetary gear set P4, whereby the first brake 03, viewed in the direction of the flow of force under traction conditions, is positioned in front of the fourth planetary gear set P4.

Furthermore, the second clutch 18, viewed axially, is positioned between the fourth planetary gear set P4 and the first planetary gear set P1, whereby the third clutch 15, from a radial view, is positioned below the second brake 05, and has with the second brake 05 a common, inner plate carrier.

Figures 2, 3:
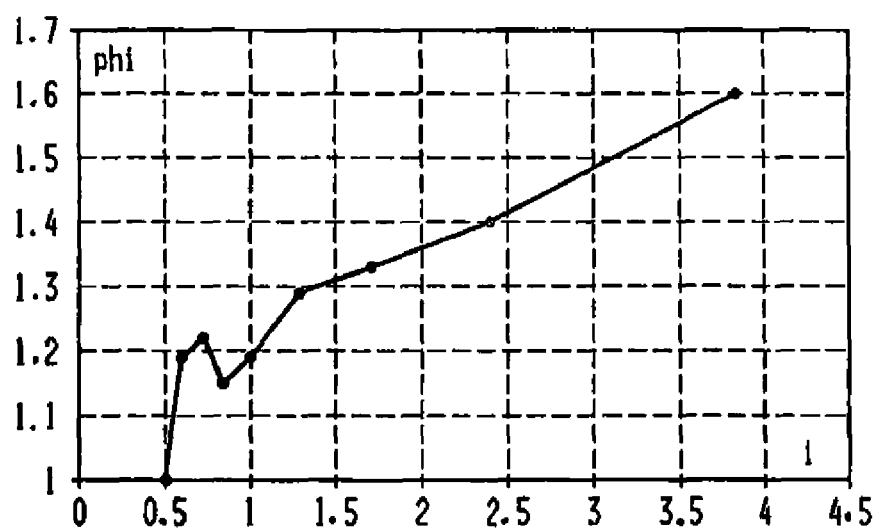
FIG. 2 A shift scheme, as an example, for a multi-step transmission, in accordance with FIG. 1.
FIG. 3 A diagram illustrating the respective gear's transmission ratio i and the corresponding step changes phi of a gear for the transmission, as shown in FIG. 1.

FIG. 2 is presenting a shift scheme example of a multi-step transmission in accordance with FIG. 1. For each gear, three shift elements are engaged. Example respective gear ratios i of the different gear steps can be seen in the diagram, also the defined gear steps resulting from it and step increments phi, respectively, to the next higher gear, whereby the value 7.62 represents the transmission's spread.

Typical values of the standard transmission ratios for the planetary gear sets P1, P2, P3, and P4 are −2.50, −1.50, −2.10, and −3.50, respectively. It is shown in FIG. 2 that, in a sequential shift pattern, double shifting and group shifting is avoided, since two neighboring gear steps use common shift elements. It can also be seen that a large spread is achieved during small gear steps. Furthermore, the transmission, as shown in FIG. 1, can realize a total of nine forward gear positions and one reverse gear position.

The first brake 03 and/or the second clutch 18 are preferably designed as claw-type shift elements. Herewith, the transmission's drag forces, caused by the small distance between the friction surface of a friction shift element, in a disengaged state, and the oil therein or air-oil mixture, respectively, are reduced. The remaining clutches 15, 17, and the remaining brakes 04, 05, are preferably implemented as friction shift elements or plate carrier elements, respectively.

The first forward gear position is arising from engagement of the second clutch 18 and the first and third brake 03, 04, the second forward gear through engagement of the first and second brake 03, 05, and the second clutch 18, the third forward gear through engagement of the third and second clutch 15, 18, and the first brake 03, the fifth forward gear through engagement of the first, second, and third clutch 17, 18, 15, the sixth forward gear through engagement of the second brake 05 and the first and second clutch 17, 18, the eighth forward gear through engagement of the third and second brake 04, 05, and the first clutch 17, and the ninth forward gear arising from engagement of the third brake 04 and the first and third clutch 17, 15. The reverse gear arises from engagement of the first and third brake 03, 04, and the third clutch 15.

Because of the fact that the first and third brake 03, 04, are engaged in the first gear position and the reverse gear position, these shift elements (designed as friction shift elements or plate shift elements, respectively) can be used as starting elements.

Under same transmission scheme conditions, in accordance with the invention, different gear steps can result, depending on the shift logic, so that it is possible of having an application specific or vehicle specific variation.

A diagram, to illustrate the actual gear's transmission ratio i and actual step ratio phi, for the transmission's values shown in FIG. 2, is the topic of FIG. 3.

It is possible, in accordance with the invention, to applying free wheels to any area of the multi-step transmission, for instance between a shaft and the housing or for the purpose of linking two shafts.

At the drive side or at the output side, axle differentials and/or distribution differentials can be positioned, in accordance with the invention.

Within the scope of a further, advantageous embodiment, the drive shaft 1 can be disengaged, as required, through a driving motor's clutch element, whereby a hydrodynamic transponder, a hydraulic clutch, a dry starter clutch, a wet starter clutch, a magnet powder clutch, or a centrifugal clutch can be applied. It is also possible to apply such a starter element, in direction of the flow of force, behind the transmission, whereby, in this case, the drive shaft 1 is being permanently linked with the motor's crankshaft.

The multi-step transmission, in accordance with the invention, also facilitates the positioning of a torsion vibration damper between the motor and the transmission.

Within an additional embodiment of the invention, not shown here, a wear-free brake can be applied to each shaft, preferably the drive shaft 1 or the output shaft 2, for instance a hydraulic or an electric retarder, or similar, which is particularly beneficial for commercial vehicles. Furthermore, to drive additional aggregates, each shaft, preferably drive shaft 1 or output shaft 2, can have an auxiliary output shaft.

The applied friction shift elements can be designed as load shift clutches or brakes. Especially, force-closing clutches or brakes, such as plate carrier clutches, belt brakes, and/or cone clutches, can be applied.

Another advantage of the here introduced multi-step transmission is that an electric motor can be positioned on each shaft, being a generator and/or an additional drive engine.

Obviously, any constructive embodiment, in particular the planetary gear sets' spatial arrangement by itself, together, and as far as technically logical, is part of scope of the protection under the present claims, without affecting the function of the transmission, as described in the claims, even if the embodiments are not explicitly presented in the drawings or in the specification.

REFERENCE CHARACTERS AND DESIGNATORS

1 First Shaft, Drive Shaft
2 Second Shaft, Output Shaft
3 Third Shaft
4 Fourth Shaft
5 Fifth Shaft
6 Sixth Shaft
7 Seventh Shaft
8 Eighth Shaft
03 First Brake
04 Third Brake
05 Second Brake
15 Third Clutch
17 First Clutch
18 Second Clutch
P1 First Planetary Gear Set
P2 Second Planetary Gear Set
P3 Third Planetary Gear Set
P4 Fourth Planetary Gear Set
i Gear Ratio
phi step change
G Enclosure

The invention claimed is:

1. A multi-step planetary transmission for an automobile, the transmission comprising:
   an input drive shaft (1) and an output shaft (2);
   first, second, third and fourth planetary gear sets (P1, P2, P3, P4) being arranged in a housing (G) of the transmission, each of the first planetary gear set (P1), the second planetary gear set (P2), the third planetary gear set (P3) and the fourth planetary gear set (P4) having a sun gear, a planet carrier and a ring gear;
   at least third, fourth, fifth, sixth, seventh and eighth rotatable shafts (3, 4, 5, 6, 7, 8);
   six shifting elements (03, 04, 05, 15, 17, 18) comprising first, second and third brakes (03, 05, 04) and first, second, and third clutches (17, 18, 15) and selective engagement of the six shifting elements (03, 04, 05, 15, 17, 18) achieves different gear ratios, between the drive shaft (1) and the output shaft (2), such that nine forward gears and one reverse gear can be implemented;
   the sun gear of the fourth planetary gear set (P4) is coupled to the third shaft (3), and the third shaft (3) is connectable, via the first brake (03), to the housing (G) of the transmission;
   the planet carrier of the fourth planetary gear set (P4) is permanently coupled to the output shaft (2), and the output shaft (2) is permanently connected to the ring gear of the second planetary gear set (P2);
   the ring gear of the fourth planetary gear set (P4) is to the seventh shaft (7);
   the seventh shaft (7) is connected to the planetary carrier of the second planetary gear set (P2) and is connectable, via the a first clutch (17), to the drive shaft (1);
   the drive shaft (1) is connectable, via the second clutch (18), to the eighth shaft (8), and, via the third clutch (15), to the fifth shaft (5);
   the eight shaft (8) is coupled to the ring gear of the first planetary gear set (P1);
   the fifth shaft (5) is permanently connected to both the sun gear of the first planetary gear set (P1) and the sun gear of the third planetary gear set (P3) and is connectable, via the second brake (05), with the housing (G) of the transmission;
   the planetary carrier of the first planetary gear set (P1) is coupled to the sixth shaft (6), and the sixth shaft (6) is coupled to an element which is coupled to both the ring gear of the third planetary gear set (P3) and the sun gear of the second planetary gear set (P2); and
   the planetary carrier of the third planetary gear set (P3) is coupled to the fourth shaft (4), and the fourth shaft (4) is connectable, via the third brake (04), with the housing (G) of the transmission.

2. The multi-step planetary transmission according to claim 1, wherein the first planetary gear set (P1), the second planetary gear set (P2), the third planetary gear set (P3) and the fourth planetary gear set (P4) are each minus-planetary gear sets.

3. The multi-step planetary transmission according to claim 1, wherein the second gear set (P2) and the third planetary gear set (P3) are axially arranged on a common gear plane, and the second planetary gear set (P2) is arranged radially about the third planetary gear set (P3) such that the first planetary gear set (P1), the second planetary gear set (P2), the third planetary gear set (P3) and the fourth planetary gear set (P4), in spatial terms, are limited to three gear set planes when viewed axially.

4. The multi-step planetary transmission according to claim 1, wherein the first clutch (17) is arranged in front of the fourth planetary gear set (P4) when viewed a direction of a flow of force during a traction condition.

5. The multi-step planetary transmission according to claim 1, wherein the first brake (03) is arranged in front of the fourth planetary gear set (P4) when viewed a direction of a flow of force during a traction condition.

6. The multi-step planetary transmission according to claim 1, wherein that the second clutch (18) is axially arranged between the fourth planetary gear set (P4) and the first planetary gear set (P1).

7. The multi-step planetary transmission according to claim 1, wherein the third clutch (15) is radially arranged below the second brake (05).

8. The multi-step planetary transmission according to claim 1, wherein the third clutch (15) and the second brake (05) have a common disc carrier.

9. The multi-step planetary transmission according to claim 1, wherein at least one of the first brake (03) and the second clutch (18) are claw-type shifting elements, and a remainder of the six shifting elements (03, 04, 05, 15, 17, 18) are frictional shifting elements.

10. The multi-step planetary transmission according to claim 1, wherein one of the first brake (03) and the third brake (04) provides a starting operation of the transmission.

11. The multi-step planetary transmission according to claim 1, wherein the output shaft (2) is integrally connected with both the planet carrier of the fourth planetary gear set (P4) and the ring gear of the second planetary gear set (P2).

12. The multi-step planetary transmission according to claim 1, wherein the sun gear of the second planetary gear set (P2) has a larger diameter than the ring gear of the third planetary gear set (P3).

13. A multi-step planetary transmission for an automobile, the transmission comprising:
   an input drive shaft (1) and an output shaft (2);
   first, second, third and fourth planetary gear sets (P1, P2, P3, P4) being arranged in a housing (G) of the transmission, each of the first planetary gear set (P1), the second planetary gear set (P2), the third planetary gear set (P3) and the fourth planetary gear set (P4) having a sun gear, a planet carrier and a ring gear;
   at least third, fourth, fifth, sixth, seventh and eighth rotatable shafts (3, 4, 5, 6, 7, 8);
   six shifting elements (03, 04, 05, 15, 17, 18) comprising first, second and third brakes (03, 05, 04) and first, second, and third clutches (17, 18, 15) and selective engagement of the six shifting elements (03, 04, 05, 15, 17, 18) for achieving different gear ratios, between the drive shaft (1) and the output shaft (2), such that nine forward gears and one reverse gear can be implemented;
   the sun gear of the fourth planetary gear set (P4) being coupled brake (03), to the housing (G) of the transmission;
   the planet carrier of the fourth planetary gear set (P4) being coupled to the output shaft (2), and the output shaft (2) being coupled to the ring gear of the second planetary gear set (P2);
   the ring gear of the fourth planetary gear set (P4) being coupled to the seventh shaft (7);
   the seventh shaft (7) being coupled to the planetary carrier of the second planetary gear set (P2) and being connectable, via the a first clutch (17), to the drive shaft (1);
   the drive shaft (1) being connectable, via the second clutch (18), to the eighth shaft (8), and, via the third clutch (15), to the fifth shaft (5);
   the eight shaft (8) being coupled to the ring gear of the first planetary gear set (P1);

the fifth shaft (5) being coupled to the sun gear of the first planetary gear set (P1) and the sun gear of the third planetary gear set (P3) and being connectable, via the second brake (05), with the housing (G) of the transmission;

the planetary carrier of the first planetary gear set (P1) being coupled to the sixth shaft (6), and the sixth shaft (6) being coupled to an element coupled to both the ring gear of the third planetary gear set (P3) and the sun gear of the second planetary gear set (P2); and the planetary carrier of the third planetary gear set (P3) being coupled to the fourth shaft (4), and the fourth shaft (4) being connectable, via the third brake (04), with the housing (G) of the transmission;

a first forward gear being implemented by engagement of the second clutch (18), the first brake (03) and the third brake (04);

a second forward gear being implemented by engagement of the first brake (03), the second brake (05) and the second clutch (18);

a third forward gear being implemented by engagement of the third clutch (15), the second clutch (18) and the first brake (03);

a fourth forward gear being implemented by engagement of the first clutch (17), the second clutch (18) and the first brake (03);

a fifth forward gear being implemented by engagement of the first clutch (17), second clutch (18) and the third clutch (15);

a sixth forward gear being implemented by engagement of the second brake (05), the first clutch (17) and the second clutch (18);

a seventh forward gear being implemented by engagement of the third brake (04), the first clutch (17) and the second clutch (18);

an eighth forward gear being implemented by engagement of the third brake (04), the second brake (05) and the first clutch (17);

a ninth forward gear being implemented by engagement of the third brake (04), the first clutch (17) and the third clutch (15); and the reverse gear being implemented by engagement of the first brake (03), the third brake (04) and the third clutch (15).

14. A multi-step planetary transmission for an automobile, the transmission comprising:

an input drive shaft (1) and an output shaft (2);

first, second, third and fourth planetary gear sets (P1, P2, P3, P4) being arranged in a housing (G) of the transmission, each of the first planetary gear set (P1), the second planetary gear set (P2), the third planetary gear set (P3) and the fourth planetary gear set (P4) having a sun gear, a planet carrier and a ring gear;

at least third, fourth, fifth, sixth, seventh and eighth rotatable shafts (3, 4, 5, 6, 7, 8);

six shifting elements (03, 04, 05, 15, 17, 18) comprising first, second and third brakes (03, 05, 04) and first, second, and third clutches (17, 18, 15) and selective engagement of the six shifting elements (03, 04, 05, 15, 17, 18) for achieving different gear ratios, between the drive shaft (1) and the output shaft (2), such that nine forward gears and one reverse gear can be implemented;

the sun gear of the fourth planetary gear set (P4) being connectable to the housing (G) of the transmission via the first brake (03), the planet carrier of the fourth planetary gear set (P4) being permanently connected to the output shaft (2), and the output shaft (2) being permanently connected to the ring gear of the second planetary gear set (P2);

the ring gear of the fourth planetary gear set (P4) being permanently connected to the seventh shaft (7), the seventh shaft (7) being permanently connected to the planetary carrier of the second planetary gear set (P2), and the seventh shaft (7) being connectable, via the a first clutch (17), to the drive shaft (1);

the drive shaft (1) being connectable, via the second clutch (18), to the eighth shaft (8), and the drive shaft (1) being connectable, via the third clutch (15), to the fifth shaft (5);

the eight shaft (8) being permanently connected to the ring gear of the first planetary gear set (P1);

the fifth shaft (5) being permanently connected to both the sun gear of the first planetary gear set (P1) and the sun gear of the third planetary gear set (P3) and being releaseable connectable, via the second brake (05), with the housing (G) of the transmission;

the planetary carrier of the first planetary gear set (P1) being permanently connected to the sixth shaft (6), and the sixth shaft (6) being permanently connected to an element permanently connected to both the ring gear of the third planetary gear set (P3) and the sun gear of the second planetary gear set (P2); and the planetary carrier of the third planetary gear set (P3) being permanently connected to the fourth shaft (4), and the fourth shaft (4) being connectable, via the third brake (04), with the housing (G) of the transmission.

15. The multi-step planetary transmission according to claim 14, wherein a first forward gear is implemented by engagement of the second clutch (18), the first brake (03) and the third brake (04);

a second forward gear is implemented by engagement of the first brake (03), the second brake (05) and the second clutch (18);

a third forward gear is implemented by engagement of the third clutch (15), the second clutch (18) and the first brake (03);

a fourth forward gear is implemented by engagement of the first clutch (17), the second clutch (18) and the first brake (03);

a fifth forward gear is implemented by engagement of the first clutch (17), second clutch (18) and the third clutch (15);

a sixth forward gear is implemented by engagement of the second brake (05), the first clutch (17) and the second clutch (18);

a seventh forward gear is implemented by engagement of the third brake (04), the first clutch (17) and the second clutch (18);

an eighth forward gear is implemented by engagement of the third brake (04), the second brake (05) and the first clutch (17);

a ninth forward gear is implemented by engagement of the third brake (04), the first clutch (17) and the third clutch (15); and the reverse gear is implemented by engagement of the first brake (03), the third brake (04) and the third clutch (15).

* * * * *